United States Patent Office 2,903,769
Patented Sept. 15, 1959

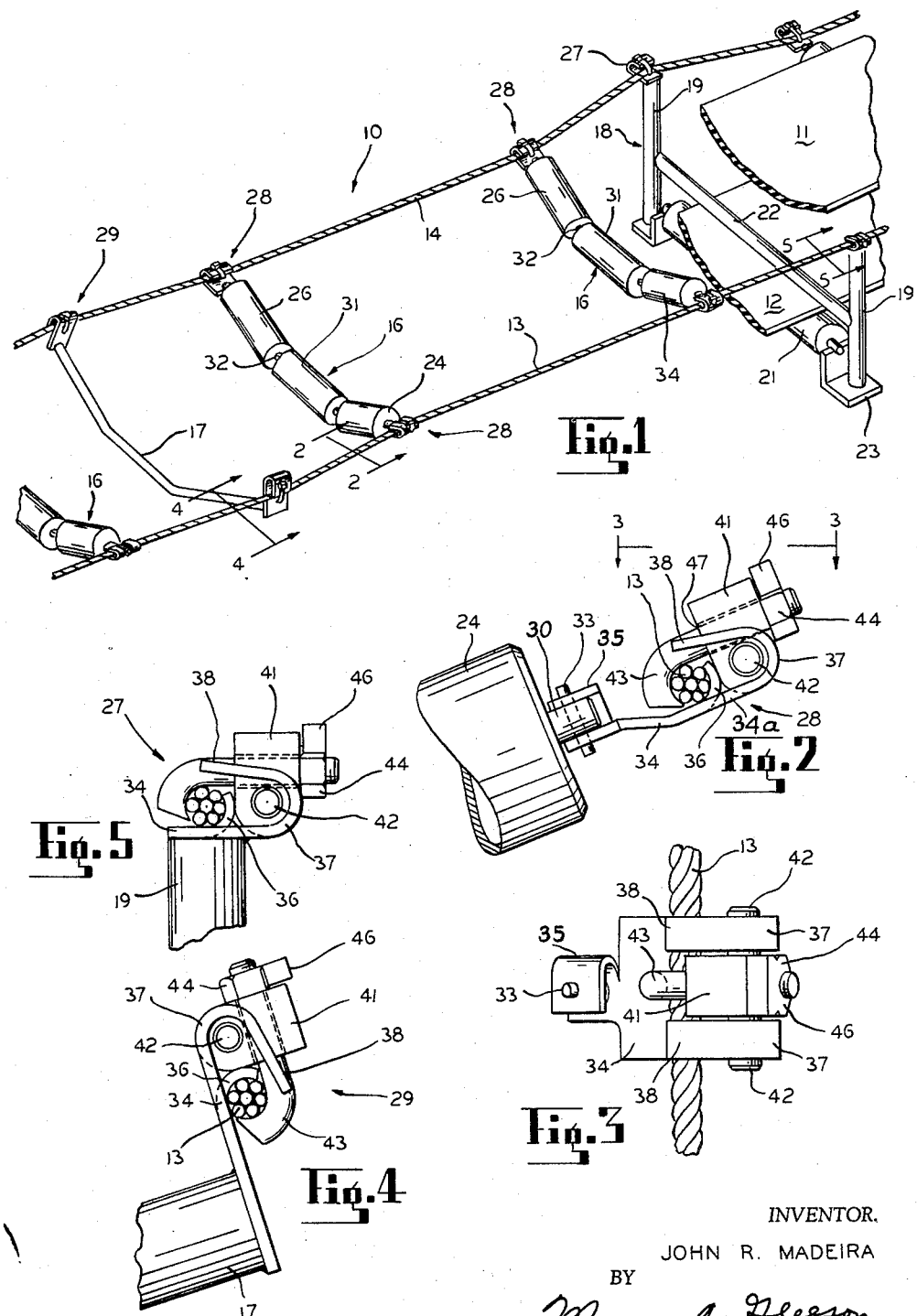

2,903,769

ROPE CLAMP FOR ROPE FRAME CONVEYOR

John R. Madeira, Chicago, Ill., assignor to Goodman Manufacturing Company, Chicago, Ill., a corporation of Illinois Application October 14, 1957, Serial No. 689,997

2 Claims. (Cl. 24—125)

This invention relates generally to rope frame conveyors and more specifically to improvements in apparatus for securing the troughing roller assemblies and the spreaders to the rope frame.

In rope frame conveyors both the spreaders and troughing roller assemblies are attached to the ropes at points along their length. Because of the high degree of portability of this type of conveyor, it is desirable to have the spreaders and troughing roller assemblies connected to the rope frames, and vice versa. Heretofore such connections have been in the form of simple friction devices. However, where such components are subjected to accidental blows as in loading or otherwise, it is necessary to provide a more positive connection to the ropes. The devices of the prior art usually have been made of several parts and require the use of tools such as wrenches for installation and removal.

It is a principal object of the present invention to provide a positive gripping connection of unitary construction which may be installed or removed by hammer blows or by the use of a wrench.

Other objects and advantages of this invention will be more readily understood by reference to the accompanying drawings in which:

Fig. 1 is a perspective view of a rope frame conveyor having rope connections according to this invention;

Fig. 2 is a view looking along the arrows 2—2 of Fig. 1 and showing the means for connecting an idler assembly to a rope frame member;

Fig. 3 is a plan view looking in the direction of the arrows 3—3 of Fig. 2;

Fig. 4 is an end view looking in the direction of the arrows 4—4 of Fig. 1, and showing the means for connecting a spreader to a rope; and Fig. 5 is an elevational view looking in the direction of the arrows 5—5 of Fig. 1 and showing the means for connecting a stand to a rope.

Referring now more particularly to the drawings, the numeral 10 generally designates a rope frame conveyor having an upper reach 11 and a lower reach 12, the upper reach 11 of which is supported on ropes 13 and 14 by idler assemblies 16. The ropes are maintained in properly spaced relationship by spreaders 17, and are both also maintained in such properly spaced relationship and supported above the ground by stands 18.

Stands 18 have a pair of upright legs 19—19 which are laterally spaced by a bar 22. The legs 19 rest upon angle shaped feet 23, the upright legs of which support a return idler 21 therebetween, the return reach 12 of the belt being supported on idler 21. The top of each leg 19 is surmounted by a connector or clamp 27 according to the present invention, and shown more fully in Fig. 5.

The idler roller assembly 16 is comprised of a center load supporting roller 31 and a pair of wing rollers 24 and 26 which are articulately connected to each other for free articulating movement in a vertical plane by joints 32. Each idler roller assembly 16 is attached to the wire rope by connectors 28 according to the present invention, and shown more fully in Figs. 2 and 3.

The spreader 17 is connected to the ropes by connectors 29 constructed according to the present invention, and shown more fully in Fig. 4.

Referring now particularly to Figs. 2 and 3, wing roller 24 turns on a shaft 30 which in turn is fastened in a bracket 35 of connector 28 by a through pin 33. Bracket 35 extends from a lower limb member 34 which may be upset in the manner so that a projection of the top surface of the wing roller 24 will clear all portions of the connector 28, so that a misaligned reach will clear the connector 28. The lower limb member 34 has a pair of extensions therefrom which are bent around to form a pair of spaced upper limbs 38 and a pair of spaced bights 37 which flank the abutment 36. A central part of the lower limb member 34 is likewise bent in a curve to form an abutment 36 for the rope strand 13.

A trunnion block 41 is positioned within the spaced legs 38 by trunnion pins 42 engaged at the bights 37 so that the trunnion block 41 can be freely pivoted and yet remain engaged between the upper limbs 38 and the lower extensions 34a.

A J-bolt extends through a hole 47 of trunnion block 41 and is adapted to be drawn tightly against the rope 13 to hold it against the abutment 36. A nut 44 is threaded onto J-bolt 43 and bears against the trunnion block 41. Nut 44 has hammer lugs 46 on one side so that it can be tightened or loosened, as desired, by a hammer blow.

It will be seen that the force executed by J-bolt 43 and nut 44 is such as to urge the trunnion block 41 against one side of the abutment 36, and the rope 13 against the other side of abutment 36 to hold the entire bracket 35 tightly against the rope 13.

Fig. 4 shows the principle applied to a spreader 17 where the member 34 is fastened directly to spreader 17, and Fig. 5 shows the principle applied to a stand where the base member 34 is fastened directly to the upright leg 19.

In assembly the connector according to the present invention is pivoted to a position where the J-bolt 43 is clear of the abutment 36 and ropes 13 or 14. The rope 13 or 14 is then brought up against the abutment 36 and the block 41 is pivoted to bring J-bolt 43 into engagement with the rope. The nut 44 is then tightened to hold the rope tightly against the abutment 36.

It will be noted that upon disassembly from the rope upon which it is mounted, the connector assembly 28 is maintained in an assembled relationship ready for connection to the rope strand. The J-bolt 43 is maintained in assembled relationship to the trunnion member by means of the clamping nut 44. The trunnion member 41 cannot be released from engagement with the connector 28 by reason of the fact that its trunnion pins 42 cannot move past the abutment 36.

While this invention has been shown and described in terms of a preferred embodiment, it is understood that various changes and modifications may be made without departing from the spirit and scope of the invention as defined in the appended claims.

I claim as my invention:

1. A connector device for connecting a component of a flexible sideframe conveyor to a flexible strand means, said device including a hanger having a pair of spaced apart bight portions and abutment means disposed intermediate of and in spaced relationship to the bight portions, an elongated longitudinally adjustable member, mounting means connected to the intermediate portion of the elongated member for pivotally mounting the elongated member between the bight portions, said elongated member extending from the mounting means in a given generally longitudinal direction and terminating beyond the abutment means with one end portion of the elongated member defining clamping means disposed adjacent to the abutment means, the other end portion of the elongated member extending from the mounting means in a direction that is substantially opposite to the said given direction, and adjustment means carried by the other end portion of the elongated member to urge the clamping means to move toward and from the abutment means along a path that is in alignment with the abutment means and substantially common with the said given direction, whereby a strand means may be effectively removably clamped between the abutment means and the clamping means and on release of the adjustment means the pivotally mounted elongated member may be pivoted to enable the clamping means to be disengaged from such strand means.

2. The connector device as set forth in claim 1 wherein said mounting means includes a block member having an opening therethrough, said elongated longitudinally adjustable member comprises a J-bolt extending through the opening in the block member, said adjustment means includes a nut in threaded engagement with the other end portion of the elongated member and in engagement with the block member, and hammer lug means on said nut.

References Cited in the file of this patent

UNITED STATES PATENTS

| | | |
|---|---|---|
| 532,562 | Janeway et al. | Jan. 15, 1895 |
| 1,135,736 | Steuler | Apr. 13, 1915 |
| 2,437,779 | Carpentier | Mar. 16, 1948 |
| 2,506,194 | Black | May 2, 1950 |
| 2,775,422 | Von Herbulis et al. | Dec. 25, 1956 |
| 2,776,044 | LoPresti | Jan. 1, 1957 |

FOREIGN PATENTS

| | | |
|---|---|---|
| 512,968 | Germany | Nov. 20, 1930 |
| 786,298 | France | Aug. 30, 1935 |
| 870,720 | France | Mar. 23, 1942 |